United States Patent
Oi et al.

[19]
[11] Patent Number: 6,067,963
[45] Date of Patent: May 30, 2000

[54] FUEL SUPPLY SYSTEM WITH FUEL EVAPORATION PREVENTION

[75] Inventors: Kiyotoshi Oi, Toyohashi; Kazuji Minagawa, Tokoname; Motoya Ito, Hekinan, all of Japan

[73] Assignee: Nippondenso Co., Ltd., Kariya, Japan

[21] Appl. No.: 08/722,683

[22] Filed: Sep. 30, 1996

[30] Foreign Application Priority Data

Oct. 9, 1995 [JP] Japan ................................. 7-261293
Jun. 21, 1996 [JP] Japan ................................. 8-162038

[51] Int. Cl.⁷ ........................ F02M 41/00; F16K 15/00
[52] U.S. Cl. ........................ 123/458; 123/497; 137/517
[58] Field of Search .................................. 123/510, 511, 123/457, 458, 497; 137/517

[56] References Cited

U.S. PATENT DOCUMENTS

| | | | |
|---|---|---|---|
| 3,861,414 | 1/1975 | Peterson, II | 137/517 |
| 4,830,046 | 5/1989 | Holt | 137/517 |
| 4,842,198 | 6/1989 | Chang | 137/517 |
| 5,339,785 | 8/1994 | Wilksch . | |
| 5,361,742 | 11/1994 | Briggs et al. . | |
| 5,398,655 | 3/1995 | Tuckey | 123/497 |
| 5,421,306 | 6/1995 | Talaski | 123/510 |
| 5,477,829 | 12/1995 | Hassinger et al. | 123/510 |
| 5,524,592 | 6/1996 | Woody et al. | 123/510 |
| 5,558,063 | 9/1996 | Minagawa et al. | 123/497 |
| 5,572,974 | 11/1996 | Wakeman | 123/497 |
| 5,603,302 | 2/1997 | Minagawa et al. | 123/510 |
| 5,613,518 | 3/1997 | Rakieshi | 137/517 |
| 5,623,910 | 4/1997 | Riggle | 123/497 |
| 5,630,399 | 5/1997 | Nomura et al. | 123/497 |

FOREIGN PATENT DOCUMENTS 54-44224 of 0000 Japan .

*Primary Examiner*—Thomas N. Moulis
*Attorney, Agent, or Firm*—Nixon & Vanderhye, PC

[57] ABSTRACT

When differential pressure between fuel flowing into a fuel control valve and fuel flowing out of the valve reaches a predetermined value, the biasing force of a compressed coil spring is countered and a shaft in the valve moves to the fuel upstream side so that a valve member is seated to terminate communication between the fuel inlet passage and the fuel outlet passage. This maintains fuel pressure at the fuel inlet passage and at the fuel outlet passage at different levels so that the fuel supply system maintains a high fuel pressure in the fuel rail to suppress fuel vapor generation during engine stoppage while also yet still providing an appropriate fuel injection pressure during rapid deceleration of the vehicle.

16 Claims, 9 Drawing Sheets

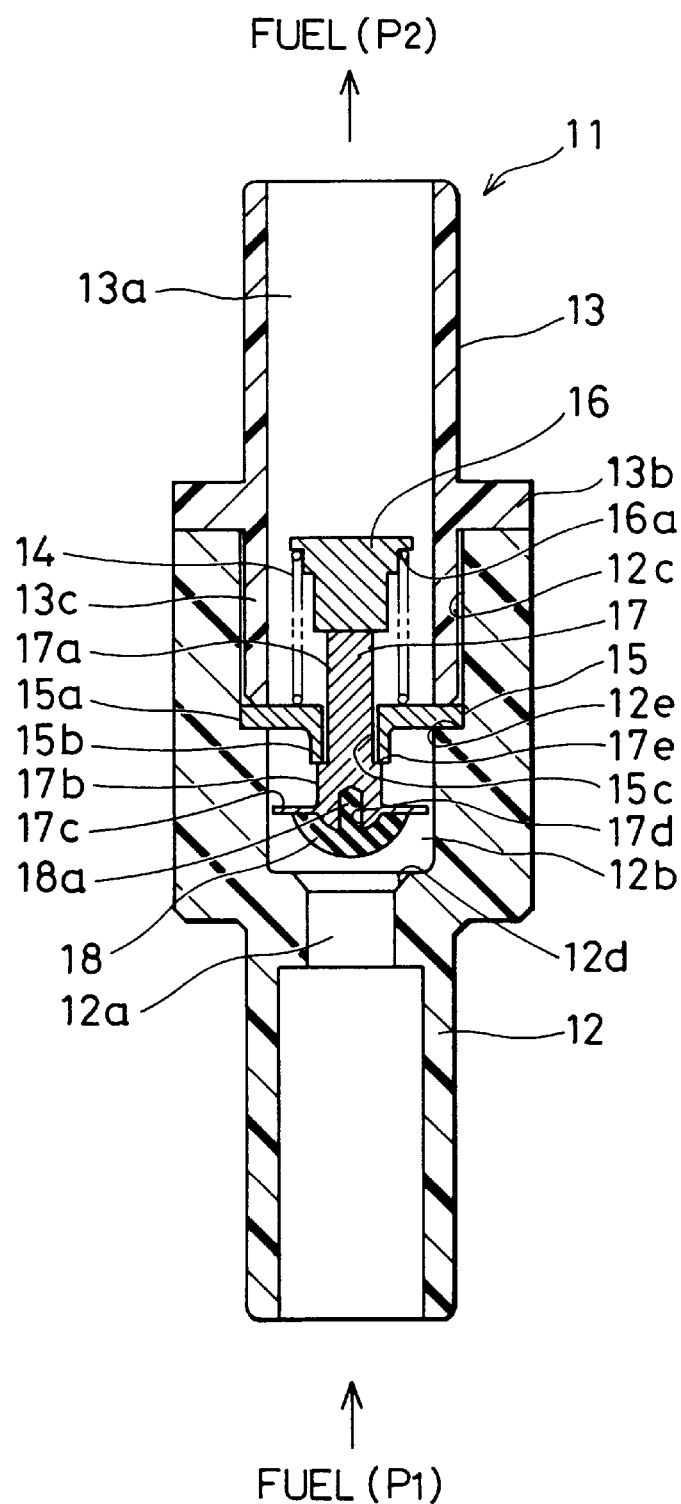

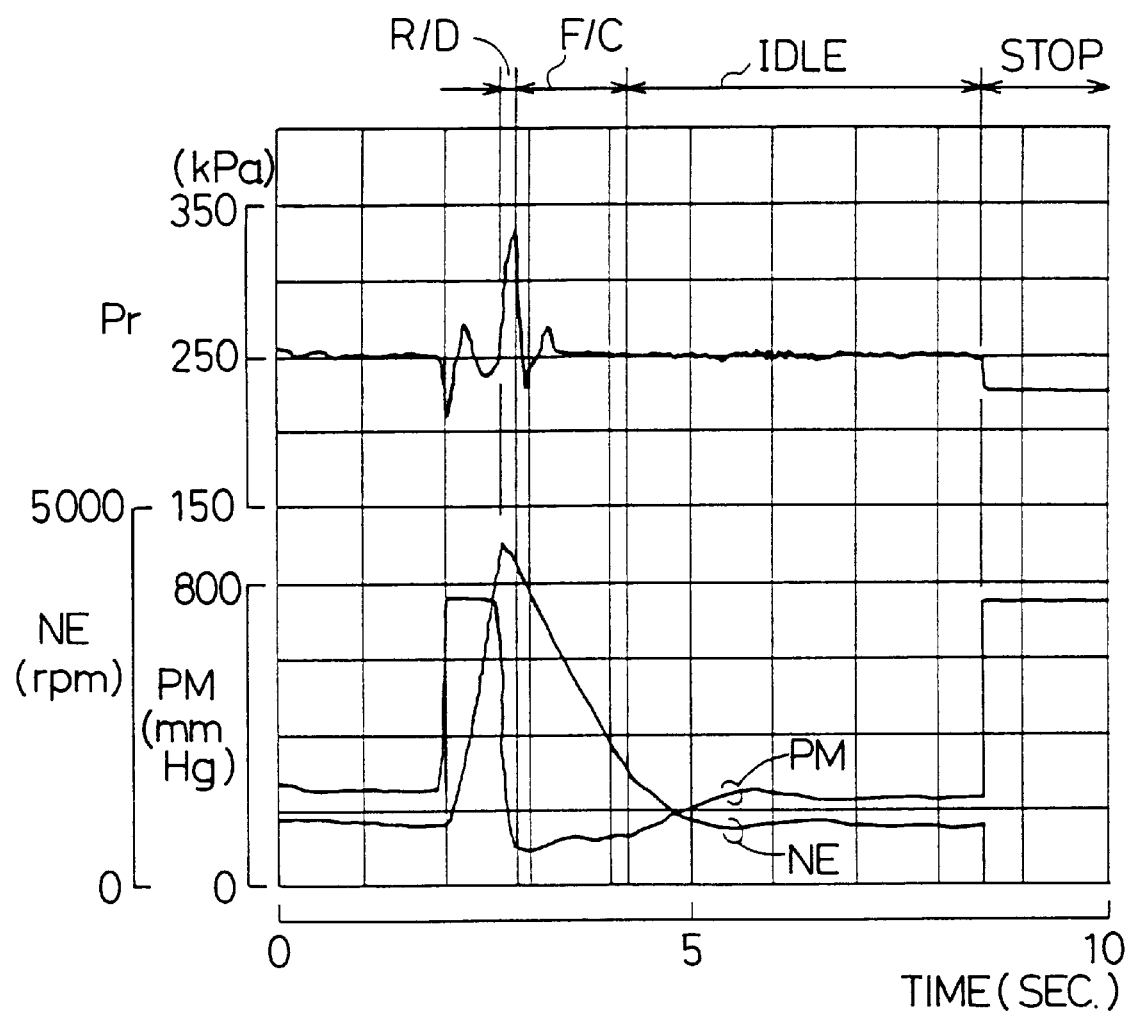

FUEL SUPPLY SYSTEM WITH FUEL EVAPORATION PREVENTION

CROSS REFERENCE TO RELATED APPLICATIONS

The present invention is based upon and claims priority of Japanese Patent Application Nos. Hei 7-261293 filed on Oct. 9, 1995 and Hei 8-162038 filed on Jun. 21, 1996, the content of which is incorporated herein by reference.

BACKGROUND OF THE INVENTION

1. Field of the Invention

The present invention relates to a fuel supply system, especially a fuel supply system having no return pipe (hereinafter called "a returnless fuel type") for returning excess fuel in a fuel rail or the like to a fuel tank. The term "fuel rail" means a fuel distributing pipe for distributing high pressure fuel supplied by a fuel pump to fuel injection valves.

2. Description of Related Art

Conventionally, the generation of vapor in the fuel is suppressed by maintaining the fuel in a fuel rail or the like at high pressure, to enable engine restarting even after the stop of an internal combustion engine (hereinafter called "an engine"). For example, U.S. Pat. No. 5,361,742 disposes a check valve between a fuel pump and the fuel rail in parallel with a differential pressure valve to keep the fuel pressure in the fuel rail or the like high after the engine stops.

According to such a construction, however, the differential pressure valve is required besides the check valve, which increases the number of necessary parts as well as raises manufacturing costs.

Under such a situation, U.S. Pat. No. 5,339,785 uses a check valve as a valve member moving to the fuel upstream side or the downstream side due to a differential pressure between the upstream and the downstream sides of a differential pressure valve.

According to this returnless fuel system disclosed in U.S. Pat. No. 5,339,785, a fuel amount matching the amount injected by a fuel injection valve is supplied by a fuel pump controlled by an electronic control unit. This control system transits a discharge pressure control signal to the fuel pump for the electronic control unit based on fuel pressure inside a fuel rail.

However, since this fuel pump is controlled via the electronic control unit, an electric signal transmission delay occurs in addition to delays of fuel pump response performance pressure transfer inside fuel supply pipes. Thus, control of the fuel pump discharge pressure lags behind pressure changes inside the fuel rail caused by fuel injection. This causes a possible fuel pressure rise due to pressure imbalance inside the fuel rail, which operates the check valve unnecessarily. More specifically, when such a control delay exists fuel cut-off during rapid deceleration of a vehicle, fuel discharge pressure does not lower even through there is now a lower fuel injection requirement. This makes the downstream side of the check valve pressure higher than that of the upstream side. Consequently the check valve closes due to such a pressure difference. In this case, "a state of fuel cut-off" means that the injection fuel amount is small or zero and, as a result, the discharge of the fuel pump reduces accompanied by a reduction in fuel amount discharged by the fuel pump. Once the check valve operates, the fuel rail pressure is maintained at a high value and, even after the stare of fuel cut-off, the fuel rail pressure is maintained at a high value. Thus, fuel pressure becomes unnecessarily high and causes improper fuel injection as well as degradation of fuel efficiency.

SUMMARY OF THE INVENTION

The present invention uses a simple structure to maintain a fuel pressure high enough to suppress vapor generation at the time of an engine stop while yet injecting only a proper amount of fuel during rapid vehicle deceleration.

The present invention has another object of providing a fuel supply system which prevents fuel leakage from a fuel control valve to the fuel downstream side at the time of an engine stop.

According to the present invention, even if the fuel pump discharge amount lags behind fuel rail pressure changes closing of a fuel control valve is prevented while also assuredly closing the fuel control valve at the time of an engine stop; thereby unnecessary maintenance of a high pressure during the normal fuel pump control delay can be prevented.

Preferably, a threshold to open and close the fuel control valve, i.e., a predetermined pressure Pc, is set to be larger than the peak value Pmax of the pressure inside the intake air suction pipe and smaller than the differential pressure Psys between the fuel supply pressure to a fuel injection valve and the intake manifold pressure inside the air suction pipe. Thus, the fuel control valve is prevented from being closed by change of the fuel supply pressure during rapid vehicle deceleration but is reliably closed by the change in fuel supply pressure at the time of an engine stoppage. By setting the range of the predetermined pressure Pc at 90<Pc<250 kPa, the same desired fuel control valve function can be realized even if Psys is 250 kPa. This prevents improper fuel injection at the time of rapid vehicle deceleration and degradation of fuel efficiency.

More preferably, the fuel control valve is set to be closed in the range of the predetermined pressure Pc by the biasing force of a biasing member applying force to a movable portion toward the fuel downstream side. The fuel control valve thus closes at the time of engine stoppage with a simple construction and still enables appropriate fuel injection without closing the valve at the time of rapid vehicle deceleration.

According to a second aspect of the present invention, a fuel control valve does not close unless $\Delta P_1$ is larger than $Pc_1$ ($\Delta P_1 > Pc_1$). Even if fuel pump control at the time of fuel cut-off during rapid vehicle deceleration delays decreases the fuel supplying pressure, fuel pressure at the downstream side is prevented from unnecessarily rising by a connection between the fuel upstream side and the fuel downstream side of the fuel control valve. Thus, improper fuel injection and degradation of fuel efficiency can be prevented. After the fuel control valve closes responsive to an engine stop, it does not open unless $\Delta P_2$ is larger than $Pc_2$ ($\Delta P_2 > Pc_2$), which maintains fuel pressure at the fuel downstream side at a high pressure. Thus, vapor generation in the fuel at the time of an engine stop can be suppressed and starting performance of the engine is improved. Furthermore, even if fuel pressure at the fuel downstream side during an engine stop decreases, fuel can be prevented from leaking from the fuel control valve to the fuel downstream side.

Preferably, an engaging member does not move to the fuel upstream side where a contacting portion enables it to be seated on a valve seat from a position where a valve member can be engaged until $\Delta P_1$ becomes larger than $Pc_1$ ($\Delta P_1 > Pc_1$). Even if fuel pressure at the fuel downstream side becomes larger than that at the fuel upstream side due to fuel pump control delay at the time of fuel cut-off during rapid deceleration, the fuel control valve is prevented from being closed. Therefore, improper fuel injection and degradation of fuel efficiency which is caused by a high fuel pressure maintained at the fuel downstream side are prevented. After the contacting portion is seated on the valve seat at the time of an engine stop, the contacting portion is not released from the valve seat unless $\Delta P_2$ becomes larger than $Pc_2$ ($\Delta P_2 > Pc_2$) since the biasing member imposes a force on the valve member toward the valve seat, which enables maintenance of a high fuel pressure at the fuel downstream side. Thus, vapor evaporation in the fuel at the time of an engine stop can be suppressed and starting performance of the engine can be improved. Furthermore, even if fuel pressure at the fuel downstream side at the time of an engine stop decreases, fuel is prevented from leaking from the fuel control valve to the fuel downstream side.

BRIEF DESCRIPTION OF THE DRAWINGS

Additional objects and advantages of the present invention will be more readily apparent from the following detailed description of preferred embodiments thereof when taken together with the accompany drawings in which:

FIG. 2 is a longitudinal cross-sectional view of a fuel control valve of a fuel supply system according to a first embodiment of the present invention;

FIG. 3A shows a state of a stop, FIG. 3B shows a light or medium loaded state, and FIG. 3C shows a fully loaded state;

FIG. 7 is a characteristic graph showing an actually-measured valve of relative fuel pressure with respect to an operation state of an engine of which fuel is supplied by the fuel supply system of the modified embodiment;

FIG. 10A shows a normal driving state, FIG. 10B shows a state of rapid deceleration, and FIG. 10C shows a state of an engine stop;

FIG. 13A shows a normal driving state, FIG. 13B shows a state of rapid deceleration, and FIG. 13C shows a state of an engine stop.

DETAILED DESCRIPTION OF THE PRESENTLY PREFERRED EMBODIMENTS

Preferred embodiments according to the present invention are hereinafter described with reference to the accompanying drawings.

(FIRST EMBODIMENT)

A first embodiment of a fuel supply system of the present invention is hereinafter explained based on FIGS. 1–8.

Figure 1:
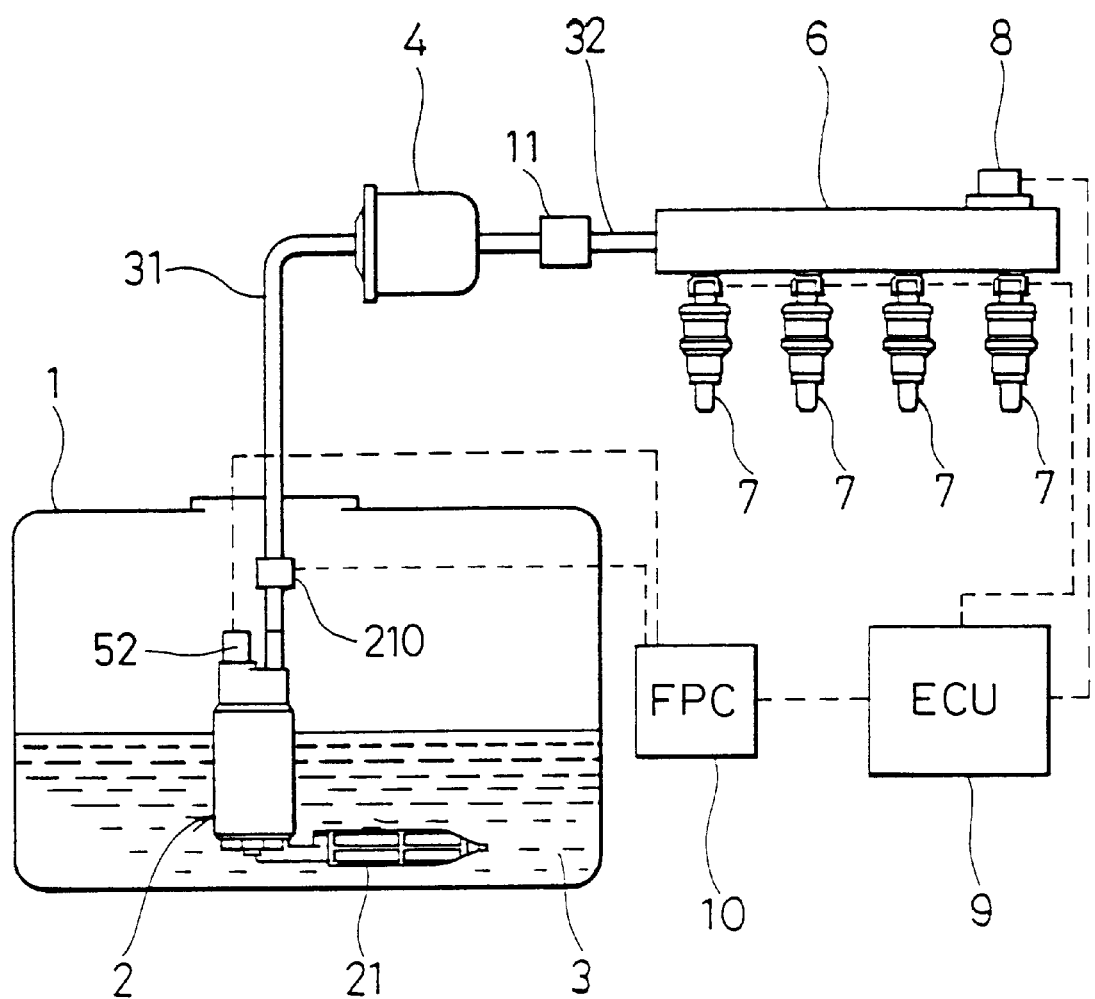
FIG. 1 is a schematic view of a fuel supply system according to the present invention.

As shown in FIG. 1, the fuel supply system is composed of a fuel pump 2 disposed inside a fuel tank 1 containing fuel 3, a high pressure fuel filter 4 connected to the discharging side of the fuel pump 2 via a fuel pipe 31, a fuel rail 6 connected to the outlet side of the high pressure fuel filter 4 via a fuel pipe 32, a flow control valve 11 (FIG. 2) disposed between the fuel rail 6 and the discharging side of the fuel pump 2, fuel injection valves 7 disposed on the fuel rail 6 and injecting the fuel to intake ports of the cylinders of an internal combustion engine (not shown), a pressure sensor 8 disposed on the fuel rail 6 and detecting fuel pressure inside the fuel ride 6, an electronic control unit (hereinafter called an "ECU") 9 as a control unit for controlling the fuel pump 2 and the fuel injection valves 7 using sensor signals including the signal from the pressure sensor 8, and a fuel pump controller (hereinafter called an "FPC") 10 for controlling electric power supplied to the fuel pump 2 from a battery (not shown) using a voltage duty ratio control technique.

A fuel filter 21 for removing water and foreign substances and the like mixed in the fuel 3 is attached to the inlet of the fuel pump 2 disposed inside the fuel tank 1. The fuel 3 sucked by the fuel pump 2 is delivered to the high pressure fuel filter 4 via the fuel pipe 31 and minute foreign substances, water and the like included in the fuel 3 are removed by the high pressure fuel filter 4. The fuel 3 filtered by the high pressure fuel filter 4 is delivered to the fuel rail 6 via the fuel pipe 32. At that time, the fuel control valve 11 disposed between the discharging side of the fuel pump 2 and the fuel rail 6 controls fuel pressure in the fuel pipe 32 and the fuel rail 6 located at a more fuel downstream side than the fuel control valve 11 as described below. The fuel 3 supplied to the fuel rail 6 is injected into intake ports of the internal combustion engine from the fuel injection valves 7.

Since the fuel supply system shown in FIG. 1 is a returnless type fuel supply system, a return pipe for returning the fuel 3 from the fuel rail 6 to the fuel tank 1 and a pressure control valve for making pressure inside the fuel rail 6 a constant value are not employed. Instead, a direct current motor 52 described below and a flow volume control valve 210 are employed, which are controlled by the FPC 10 so that the fuel pump 2 discharges the fuel at a predetermined discharge pressure while the pressure inside the fuel rail 6 maintains a predetermined pressure according to the sensor signal from pressure sensor 8 detecting the pressure inside fuel rail 6.

As shown in FIG. 2, the fuel control valve 11 disposed a the midway of the fuel pipe 31 or the fuel pipe 32 is composed of an inlet pipe 12 connected to the fuel upstream side, an outlet pipe 13 connected to the fuel downstream side, a compressed coil spring 14 contained inside the outlet pipe 13, a sleeve 15, a stopper 16, a shaft 17, and a valve member 18. The stopper 16, the shaft 17, and the valve member 18 are moveable.

A fuel inlet passage 12a going from the fuel upstream side to the fuel downstream side, a valve member container 12b, and an insertion hole 12c are respectively formed in the cylindrical inlet pipe 12 made of resin. A tapered valve seat 12d where diameter becomes larger toward the fuel downstream side is formed between the fuel inlet passage 12a and the valve member container 12b having a larger diameter than that of the fuel inlet passage 12a. A step 12e is formed between the valve member container 12b and the insertion hole 12c where diameter is larger than that of the valve member container 12b. The sleeve 15 described below is restricted to move to the fuel upstream side by making contact with the step 12e.

The outlet pipe 13 made of resin has a cylindrical shape, and a flange 13b extending toward the outside in the diameter direction is formed at the substantially central portion in the longitudinal direction of the outlet pipe 13. The outer diameter of the outer peripheral wall of the outlet pipe 13 located at a more fuel upstream side than the flange 13b is slightly smaller than the inner diameter of the insertion hole 12c of the inlet pipe 12. Thus, the edge of the fuel upstream side of the outlet pipe 13 can be inserted into the insertion hole 12c of the inlet pipe 12. A force is imposed on the sleeve 15 toward the fuel upstream side by the edge of the fuel upstream side of the outlet pipe 13.

The sleeve 15, composed of a larger diameter portion 15a having a slightly smaller diameter than the inner diameter of the insertion hole 12c of the inlet pipe 12 and a smaller diameter portion 15b formed on the same axis as the larger diameter portion 15a, has a concave cross-sectional shape. A sliding hole 15c where the shaft 17 can slide is formed at the axial center of sleeve 15. Furthermore, a fuel passage (not shown) formed in sleeve 15 is disposed to allow fuel to flow from the valve member container side of inlet pipe 12 to fuel outlet passage 13a of outlet pipe 13. The sleeve 15 is contained in insertion hole 12c of inlet pipe 12 to locate smaller diameter portion 15b at the fuel upstream side. In this case, sleeve 15 is positioned between step 12e of inlet pipe 12 and the edge of the fuel upstream side of outlet pipe 13.

The shaft 17 made of a metal such as brass is composed of a smaller diameter portion 17a having substantially the same outer diameter as the inner diameter of sliding hole 15c of sleeve 15, a larger diameter portion 17b located at a more fuel upstream side than smaller diameter portion 17a, and a flange 17c located at the fuel upstream side of larger diameter portion 17b and extending toward the outside in the diameter direction. A hole 17d receiving a protruding portion 18a of valve member 18 is formed at the shaft center at the edge of the side having flange 17c of shaft 17. The shaft 17 is supported slidably by sleeve 15 by inserting smaller diameter portion 17a into the sliding hole 15c of sleeve 15. The step 17e between smaller diameter portion 17a and larger diameter portion 17b of shaft 17 restricts movement of shaft 17 towards the fuel downstream side, whereas valve member 18 and valve seat 12d restricts movement of shaft 17 towards the fuel upstream side.

The stopper 16 (made of metal or the like located at the edge of the fuel downstream side of shaft 17) contacts and supports the edge of the fuel downstream side of compressed coil spring 14, imposing a biasing force on shaft 17 toward the fuel downstream side by a spring seat 16a.

The compressed coil spring 14 is located between sleeve 15 and stopper 16. Since the edge of the fuel upstream side of spring 14 contacts the edge surface of the fuel downstream side of sleeve 15 and the edge of the fuel downstream side of spring 14 contacts the spring seat 16a of stopper 16, a biasing force is imposed on shaft 17 toward the fuel downstream side. As for the biasing force of compressed coil spring 14, when the differential pressure $\Delta P = P_2 - P_1$ between pressure $P_1$ of fuel flowing into fuel inlet passage 12a of inlet pipe 12 and pressure $P_2$ of fuel flowing out of fuel outlet passage 13a of outlet pipe 13 reaches a predetermined pressure Pc, shaft 17 is set to move to the fuel upstream side (downward in the figure) by countering the biasing force of compressed coil spring 14. Therefore, when a load $A \cdot \Delta P$ imposed in the axial direction of the shaft 17 which is the product of an area A of the edge surface of the fuel downstream side of flange 17c of shaft 17 and the aforementioned differential pressure $\Delta P$ satisfies the following formula (1) (unit: N), shaft 17 moves to the fuel upstream side by countering the pressure biasing force of compressed coil spring 14.

$$A \cdot \Delta P > A \cdot Pc = c + f \tag{1}$$

Here, "c" represents a friction force generated when shaft 17 slides inside the sliding hole 15c of the sleeve 15 and "f" represents a biasing force of the compressed coil spring 14, respectively.

In other words, when the above-described differential pressure $\Delta P$ exceeds a predetermined value Pc, the valve member 18 disposed at the edge of the fuel upstream side of the shaft 17 is seated on the valve seat 12d of the inlet pipe 12, i.e., the fuel control valve 11 closes, which shuts off the communication between the fuel inlet passage 12a and the fuel outlet passage 13a to maintain a pressure $P_1$ of the fuel flowing into the fuel inlet passage 12a and a pressure $P_2$ of the fuel flowing out of the fuel outlet passage 13a at different values.

The valve member 18 made of rubber of the like located at the edge of the fuel upstream side of the sleeve 15 is formed in the shape of a hemisphere to cover the edge surface of the fuel upstream side of the flange 17c and the edge surface of the fuel upstream side of the shaft 17. The valve member 18 has the protruding portion 18a extending toward the fuel downstream side. The valve member 18 can be fixed on the edge of the shaft 17 by inserting the protruding portion 18a into the hole 17d of the shaft 17.

The fuel sucked by the fuel pump 2 is forcibly delivered to the flow volume control valve 210. The amount of fuel supplied to the engine is controlled by the fuel pump and, in turn, by ECU 9 according to operational conditions of the engine. Control of flow volume control valve 210 is performed by controlling excess fuel discharged to the fuel tank 1 from a discharging passage having the construction of FIGS. 3A–3C that is opened or shut off by a valve member. In short, excess fuel is deducted from the discharged fuel pump 2 before it is supplied to fuel rail 6.

Figure 3A:
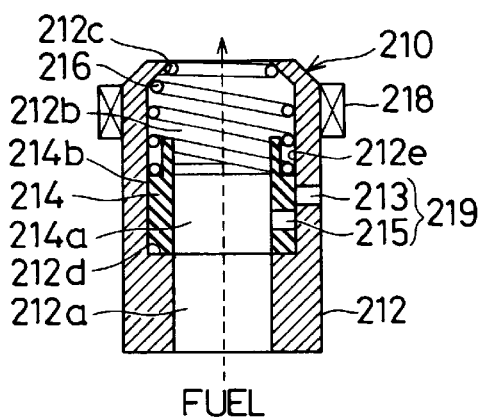
FIGS. 3A–3C are view explaining operations of the flow volume control valve of the first embodiment where
Figure 3B:
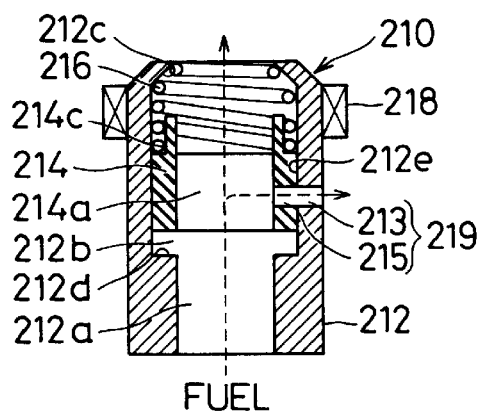
Figure 3C:
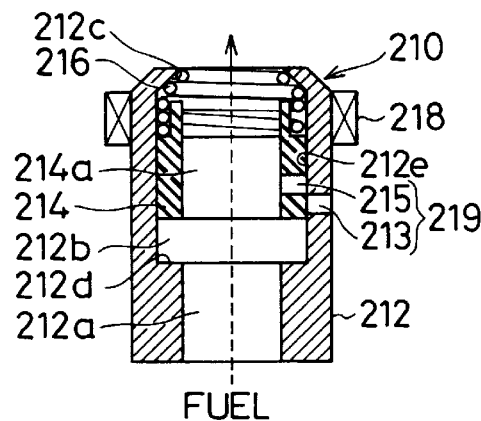

As shown in FIGS. 3A–3C, the flow volume control valve 210 is composed of housing 212, movable portion 214, compressed coil spring 216, and exciting coil 218 and may be formed integrally with or separately from fuel pump 2.

The housing 212 made of a non-magnetic material has a fuel passage 212a therein communicating with the fuel pump 2. A sliding hole 212b communicating with fuel passage 212a at the fuel downstream side of fuel passage 212a (formed at one end of the housing 212 and having a larger diameter than that of the fuel passage 212a) is formed toward the other end of the housing 212 to pass the fuel therethrough, that is, communicating passages composed of fuel passage 212a and sliding hole 212b pass through housing 212 from one end to the other end thereof. A stopper 212d contacting one end of movable portion 214 is formed at the connecting portion between fuel passage 212a and sliding hole 212b. The other end located at the fuel downstream side of sliding hole 212b has a taper 212c contacting one end of the compressed coil spring 216. A communicating passage 213 is formed to correct the outside and the inside of housing 212 at the fuel upstream side of sliding hole 212b. The communicating passage 213 forms discharging passage 219 by communicating with a communicating passage 215 formed in movable portion 214.

The cylindrical movable portion 214 made of a ferromagnetic material is formed slidably inside sliding hole 212b of housing 212. In short, movable portion 214 has an outer peripheral wall 214b having a slightly smaller outer diameter than the inner diameter of sliding hole 212b and has a central fuel passage 214a passing the fuel supplied by fuel pump 2 therethrough. When movable portion 214 is contained in sliding hole 212b of housing 212, it can move in the axial direction inside sliding hole 212b, i.e., vertically in the Figures. When movable portion 214 moves to the fuel upstream side, i.e., to the lower side in FIG. 3A (engine stop condition), one end of the movable portion 214 contacts the stopper 212d of the housing 212. At that time, the first communicating passage 215 passing through the inner/outer wall of movable portion 214 is located at a more fuel upstream side than the second communicating passage 213 of housing 212 whereas the opening of the first communicating passage 215 is located at a position to close the opening by inner wall 212e of sliding hole 212b of housing 212. On the other hand, when movable portion 214 moves to the fuel upstream side, i.e., to the upper side in FIG. 3B (light of medium engine load condition), the opening of first communicating passage 215 communicates with the second communicating passage 213 of the housing 212 in passing and then is closed by the inner wall 212e of the sliding hole 212b again.

Thus, the opening of first communicating passage 215 communicates with second communicating passage 213 or is closed by inner wall 212e of sliding hole 212b depending on the position of the movable portion moving in the axial direction.

The compressed coil spring 216 is located between the edge of the fuel downstream side of movable portion 214 contained in housing 212 and the edge of the fuel downstream side of housing 212, of which one end contacts taper 212c of housing 212 and the other end contacts a spring seat 214c formed at the edge of the fuel downstream side of movable portion 214. Thereby, a force is imposed on movable portion 214 toward the fuel stream side by the biasing force of compressed coil spring 216. In short, movable portion 214 maintains a state in which it is biased toward the fuel upstream side by compressed coil spring 216.

The coil 218 is wound around the outer peripheral wall located at the edge of the fuel downstream side of housing 212. Electric supply to coil 218 generates electromagnetic attracting force which attracts movable portion 214 made of ferro-magnetic material toward the fuel downstream side by countering the biasing force of compressed coil spring 216. The moving amount of movable portion 214 is controlled depending on a voltage applied to coil 218.

Once movable portion 214 is attracted to the fuel downstream side, the opening of first communicating passage 215 having been closed by the inner wall 212e of sliding hole 212b of housing 212 can communicate with second communicating passage 213 of housing 212. Thereby, discharging passage 219 composed of first communicating passage 215 and second communicating passage 213 can pass through, as shown in FIG. 3B. In the state shown in FIG. 3B, a portion of the fuel circulating inside fuel passages 212a and 214a is returned to fuel tank 1 via discharging passage 219. This is because the fuel discharged outside fuel passages 212a and 214a in the flow volume control valve 210 flows into the fuel tank 1 since flow volume control valve 210 is located inside fuel tank 1.

In general, when the voltage applied to coil 218 is increased, an electromagnetic attracting force increases, which results in an increase in the electromagnetic attracting force generated by coil 218. The movable portion 214 further moves toward the fuel downstream side as shown in FIG. 3C (full engine load condition), which closes the opening of first communicating passage 215 of the movable portion 214 by inner wall 212e of sliding hole 212b again. Thereby, communication of the discharging passage 219 composed of first communicating passage 215 and second communicating passage 213 is shut off.

An operation of flow volume control valve 210 is further explained with reference to FIG. 3A.

(A) When the engine is at stop or start operation, the voltage supplied to fuel pump 2 is set to 0 V or the lowest voltage, and the voltage applied to coil 218 of the flow volume control valve 210 is also 0 V or the lowest voltage. In this state, because coil 218 does not generate much electromagnetic attracting force (or even if it does it will be an extremely small electromagnetic attracting force), movable portion 214 maintains the state where it is biased toward the fuel upstream side by compressed coil spring 216. In this case, first communicating passage 215 of movable portion 214 and second communicating passage 213 of housing 212 do not communicate with each other as shown in FIG. 3A; thereby, the communication of discharging passage 219 is shut off. Even if the fuel flows into the fuel passage 212a due to an operation of the fuel pump by the starting of the engine, the fuel does not return to fuel tank 1 via the discharging passage 219 but is supplied to the engine via fuel passage 214a, which provides necessary fuel pressure for the start-up of the engine as well as to start the engine smoothly.

(B) When an operational condition of the engine is idling which does not require a relatively large amount of fuel or is in normal operation (a light load condition or a medium load condition), voltage applied to fuel pump 2 is set to a relatively low voltage, which similarly sets voltage applied to coil 218 to a relatively low voltage. As a result, a relatively small electromagnetic force is generated in coil 218. The movable portion 214 is attracted to the fuel downstream side by a predetermined distance by this electromagnetic attracting force. The first passage 215 of movable portion 214 and second passage 213 of housing 212 communicate with each other providing communication of discharging passage 219 as shown in FIG. 3B, thereby, the fuel flowing into fuel passage 212a and fuel passage 214a is returned to fuel tank 1 from the flow volume control valve 210 via discharging passage 219. In other words, a portion of the discharged fuel from fuel pump 2 returns to fuel tank 1 and the remaining fuel is delivered to the engine. Thus, even if the fuel flow volume required by the engine is extremely small (such as only a few liter/h), the fuel amount delivered from the fuel pump 2 does not become a few liter/h or extremely small, but fuel is returned to the fuel tank 1 which enables stabilization of the fuel pump rotational speed.

(C) When the engine is at maximum output (a full-load condition), the voltage applied to fuel pump 2 is set high, which sets voltage applied to coil 218 to a high value and, as a result, a large amount of electromagnetic force is generates in coil 218. The movable portion 214 is further attracted to the fuel downstream side and approaches coil 218 most closely as shown in FIG. 3C. The communication of first passage 215 of movable portion 214 with second passage 213 of housing 212 is shut off by inner wall 212e of sliding hole 212b again to shut off discharging passage 219. Thus, fuel inside fuel passage 212a and fuel passage 214a does not return to fuel tank 1 via discharging passage 219. All the fuel delivered by fuel pump 2 can be supplied to the engine, which enables a fuel supply as required for full engine load operation.

When the engine is turned off or fully-loaded according to the first embodiment, fuel passing through fuel passage 212a and 214a is not discharged outside flow volume control valve 210 via discharging passage 219 due to shut-off of the discharging passage 219 composed of first communicating passage 215 and second communicating passage 213 depending on the moving position of movable portion 214. On the other hand, when the engine is in a light or a medium load condition, fuel passing through the fuel passages 212a and 214a is discharged outside flow volume control valve 210 via discharging passage 219 due to communication of discharging passage 219 depending on the moving position of movable portion 214.

Therefore, fuel pump 2 does not discharge outside flow volume control valve 210 via discharging passage 219 at start-up of the engine, i.e., fuel does not return to fuel tank 1, which ensures the necessary fuel pressure build-up and enables starting of the engine effectively and smoothly. Even in a fully-loaded engine condition, the present embodiment can effectively deliver a sufficient amount of fuel as required by the engine because fuel pump 2 does not return fuel to fuel tank 1. Furthermore, in a light or a medium engine load condition, fuel from fuel pump 2 is discharged outside flow volume control valve 210 via discharging passage 219 to fuel tank 1, i.e., fuel returns to fuel tank 1, so that the fuel delivered by fuel pump 2 does not become a few liter/h which is an extremely small amount but includes fuel to be returned to fuel tank 1. Thereby, the present embodiment stabilizes the rotation of fuel pump 2 and effectively increases the capacity of fuel pump 2 to rapidly respond to a following high fuel demand. In other words, the time required to effect relative fuel pressure changes can be shortened for rapid acceleration or deceleration.

(Modification of First Embodiment)

A modification of the first embodiment where a fuel control valve is integrally formed with the fuel pump is hereinafter described with reference to FIGS. 4 and 5.

Figure 4:
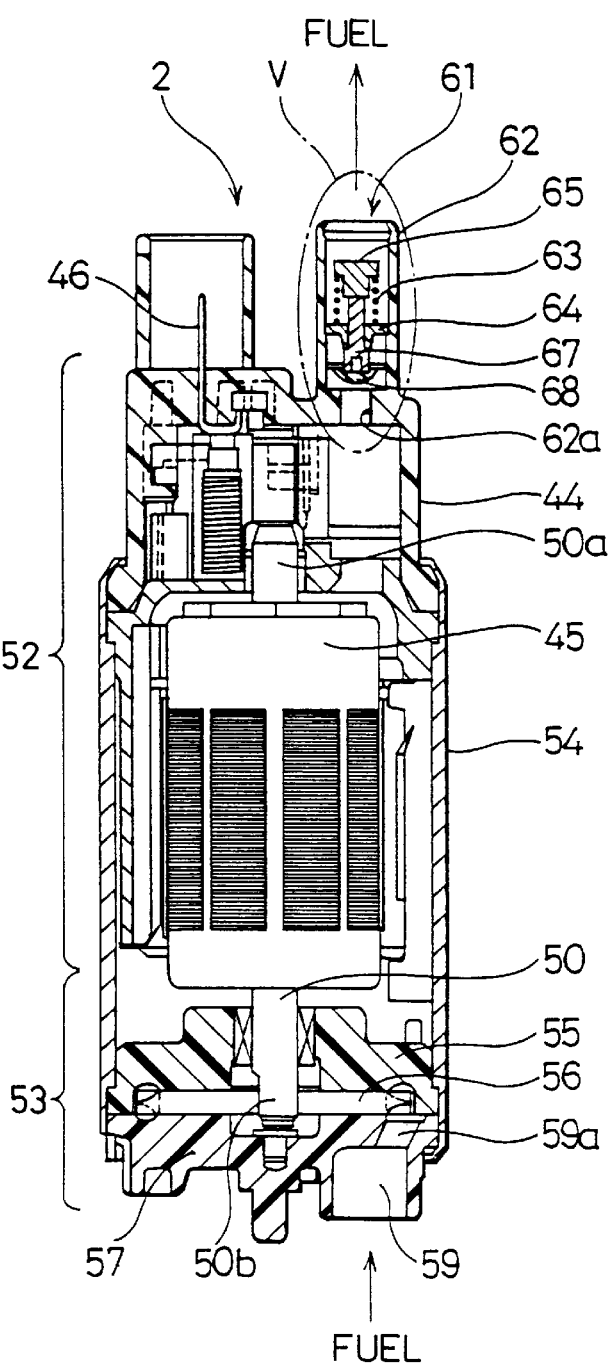
FIG. 4 is a longitudinal cross-sectional view of a fuel pump of a fuel supply system according to a modification of the first embodiment.

The fuel pump 2 is composed of a direct current motor 52 and a pump 53 as shown in FIG. 4. An armature 45 rotated responsive to electric power supplied to terminal 46 is contained in housing 54. One end 50a of shaft 50 fixed to armature 45 is rotatably supported.

As for pump 53, casing 55 and pump cover 57 are fixed inside housing 54 by press-fitting or the like. An impeller 56 located between casing 55 and pump cover 57 and fixed to the other end 50b of shaft 50 is rotatably contained between casing 55 and pump cover 57. A predetermined minute space is provided between impeller 56 and casing 55 and pump cover 57 surrounding its periphery, thereby, impeller 56 can rotate while sliding in casing 55 and pump cover 57.

The pump cover 57 has a communicating hole 59a passing through the fuel flowing from a suction port 59 and the fuel filtered by the fuel filter 21 is sucked into the pump chamber via the communicating hole 59a. The fuel sucked into the pump chamber by rotation of impeller 56 flows into housing 54 via a discharging outlet (not shown) in the casing and consequently is discharged to fuel pipe 31 via a fuel control valve 61 serving as a discharging port of housing 44. Thus, filtered fuel is sucked by fuel pump 2.

The fuel control valve 61 is an example where the aforementioned fuel control valve 11 has a function of a discharging port of housing 44 integrally in its construction.

As for fuel control valve 61, a cylindrical housing 62 is integrally molded with housing 44 of the fuel pump 2 with resin. The housing 62 includes therein a compressed coil spring 63, a sleeve 64, a stopper 65, a shaft 67, and a valve member 68 as best shown in FIG. 5. The aforementioned formula (1) is also valid in the relationship among spring 63, sleeve 64, stopper 65, and shaft 67.

A step 62d is formed between a valve member container 62b located at the fuel upstream side and a fuel outlet passage 62c having a larger diameter than that of valve member container 62b. The step 62d restricts motion of sleeve 64 to the fuel upstream side.

The sleeve 64 is biased toward the fuel upstream side by a sleeve stopper 66 contained in fuel outlet passage 62c and is fixed by the edge of the fuel upstream side of a pin 66a of sleeve stopper 66 and step 62d.

The sleeve stopper 66 is composed of an annular portion and plural pins 66a extending in the shaft direction. These pins 66a extending toward the fuel stream side are contained in fuel outlet passage 62c; thereby, sleeve 64 is biased toward the fuel upstream side by pins 66a. The annular portion located at the fuel downstream side of sleeve stopper 66 is caulked with heat so that the diameter of the edge of the fuel downstream side of housing 62 can be smaller and can bend toward the interior in the diameter direction, which forms a fixed caulked portion 62f to prevent the annular portion from going out of fuel outlet passage 62c.

A tapered valve seat 62e expanding toward the fuel downstream side is formed between a fuel inlet passage 62a and the valve member container 62b formed in housing 62. A valve member 68 disposed at the edge of shaft 67 can be seated on valve seat 62e, which opens of closes fuel control valve 61. Since closing of fuel control valve 61 shuts off communication of fuel inlet passage 62a with fuel outlet passage 62c, a pressure $P_1$ of fuel flowing into fuel inlet passage 62a and a pressure $P_2$ of fuel flowing out of fuel outlet passage 62c can be maintained at different values.

A condition for closing fuel control valve 61 is hereinafter explained based on FIGS. 6 and 7. The construction of the first embodiment is substantially the same as the modified embodiment and the valve closing condition of the first embodiment is the same as that of the modified embodiment.

Figure 6:
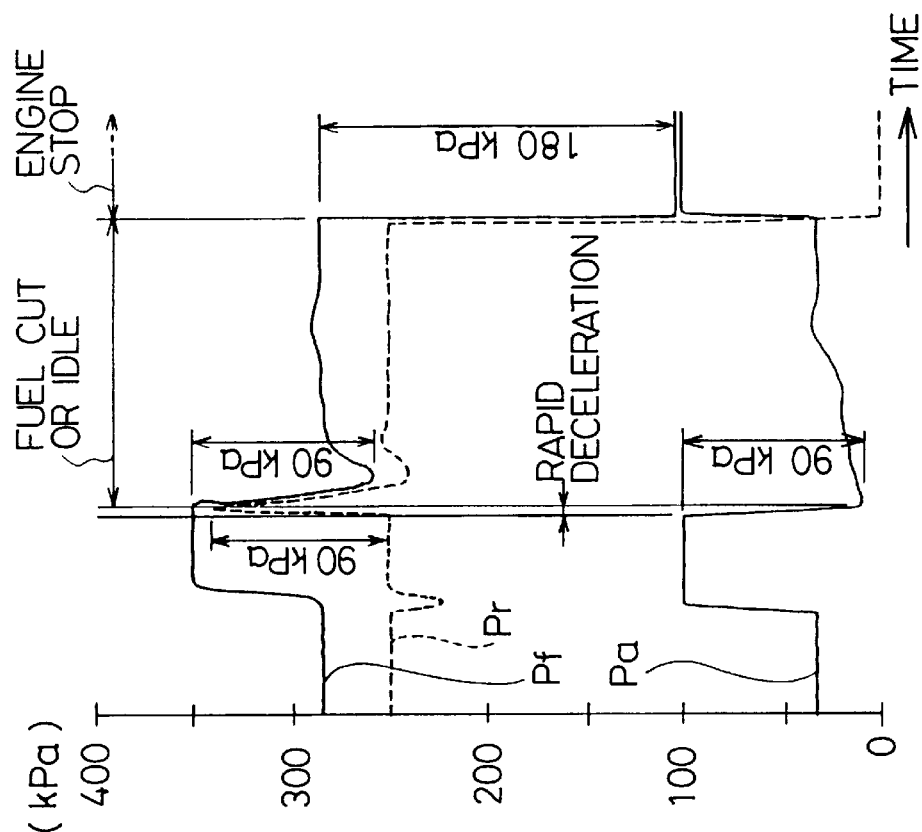
FIG. 6 is a graph showing a valve closing condition of a fuel control valve of the modified embodiment.

FIG. 6 shows respective changing states of fuel pressure inside fuel rail 6, the intake pressure inside an engine air intake (not shown) for fuel injection by fuel injection valves 7, and the relative fuel pressure obtained by deducting the intake suction pipe pressure from the fuel pressure.

FIG. 6 shows the intake air pressure changes depending on an operational condition of the engine and the fuel pressure also changes in substantially the same manner as the intake air pressure. This is because discharge pressure of fuel pump 2 is controlled to follow the change in intake air suction pressure by ECU 9 and FPC 10.

The relative fuel pressure, i.e., the difference between the fuel pressure and the intake air suction pressure, does not remain at a predetermined value (hereinafter called "a system fuel pressure"), for example, 250 kPa as shown with the characteristic curve of the dashed line in FIG. 6; however, it decreases by almost 25 kPa and then increases by almost 90 kPa. This happens due to the response delay of fuel pressure controlled with respect to the change of the intake air suction pressure, which is caused by such delay factors as delays of a pressure sensor (not shown) for detecting the intake air suction pressure, the pressure sensor 8 for detecting fuel pressure Pf inside fuel rail 6, a processing cycle of the ECU 9 to process the respective signals periodically from a rotation sensor or the like (not shown) for detecting the rotation speed of the engine, a necessary period of time for arithmetic processing of the ECU 9 and for signal converting by FPC 10, inertia force for the discharge pressure of the fuel pump 2 to reach a predetermined value by the control signal of the FPC 10, and supersonic expansion of the fuel pipes 31 and 32 from fuel pump 2 to fuel rail 6. Thus, the total sum of delay periods due to the respective delay factors results in responsive delay of the fuel pressure, which changes the aforementioned relative fuel pressure.

Accordingly, when the engine load rapidly decreases at rapid deceleration or the like, the intake air suction pressure rapidly decreases (approximately 90 kPa in FIG. 6) correspondingly. However because the fuel pressure cannot follow such a rapid decrease of intake air suction pressure (due to the overall responsive delay) the relative fuel pressure rapidly increases by the intake air suction pressure (approximately 90 kPa in FIG. 6) which decreased rapidly. This state is illustrated by the dashed line at the rapid deceleration time. When fuel control valve 61 (or 11) closes by this change of relative fuel pressure, pressure in fuel pipes 31 and 32 located at more fuel downstream side than fuel control valve 61 and fuel rail 6 can be maintained at a high pressure in the state of fuel cut-off after rapid deceleration and in the state of idling, which causes improper fuel injection and degradation of fuel efficiency. Therefore, it is necessary to prevent fuel control valve 61 from being closed due to the change of relative fuel pressure.

Since fuel pressure and intake air suction pressure become the atmospheric pressure, i.e., approximately 100 kPa after the engine stops, fuel pressure abruptly decreases at the time of engine stop. The decreased pressure value compared to the pressure valve before engine stop reaches approximately 180 kPa. This state of change in fuel pressure is illustrated by the solid line at the time of engine stop. Closing of fuel control valve 61 (or 11) due to the change of fuel pressure can maintain pressure in fuel pipes 31 and 32 located at the more fuel downstream side than fuel control valve 61 and fuel rail 6 or the like at a high pressure. Thus, vapor generation in the fuel during engine stoppage can be suppressed.

Accordingly, the valve closing condition of fuel control valve 61 (or 11) should be set so that the valve is not closed by the change of relative fuel pressure at rapid deceleration or the like but should be closed by the change of fuel pressure at engine stoppage. In other words, when the load $A \cdot \Delta P$ imposed on compressed coil spring 63 of fuel control valve 61 satisfies the condition of the aforementioned formula (1), fuel control valve 61 closes. Therefore the biasing force "f" of compressed coil spring 63 should be set to open or close the valve by using a predetermined value $A \cdot Pc = c + f$ as a threshold.

In case the relative fuel pressure's changing value is generally expressed, the relative fuel pressure's changing value at the time of rapid deceleration or the like is equivalent to the maximum changing value Pmax of the intake air suction pressure whereas relative fuel changing pressure at engine stoppage is equivalent to system fuel pressure Psys. From this aspect, the range of a predetermined pressure Pc to close fuel control valve 61 (or 11) can be expressed by the following formula (2) (unit: Pa). The biasing force "f" of compressed coil spring 63 is set to close fuel control valve 61 within this range.

$$Pmax < Pc < Psys \tag{2}$$

The range of this predetermined pressure Pc in the case of the respective characteristics shown in FIG. 6 is expressed by the following formula (3) (unit: Pa) since the system fuel pressure Psys is 250 kPa and the maximum changing value Pmax of the air intake suction pressure is 90 kPa.

$$90 < Pc < 250 \tag{3}$$

In case a design tolerance is provided by supplying margins of 20 kPa to the upper limit value and the lower limit value, respectively, the range of the predetermined pressure Pc is expressed by the following formula (4) (unit: Pa).

$$110 < Pc < 230 \tag{4}$$

Figure 5:
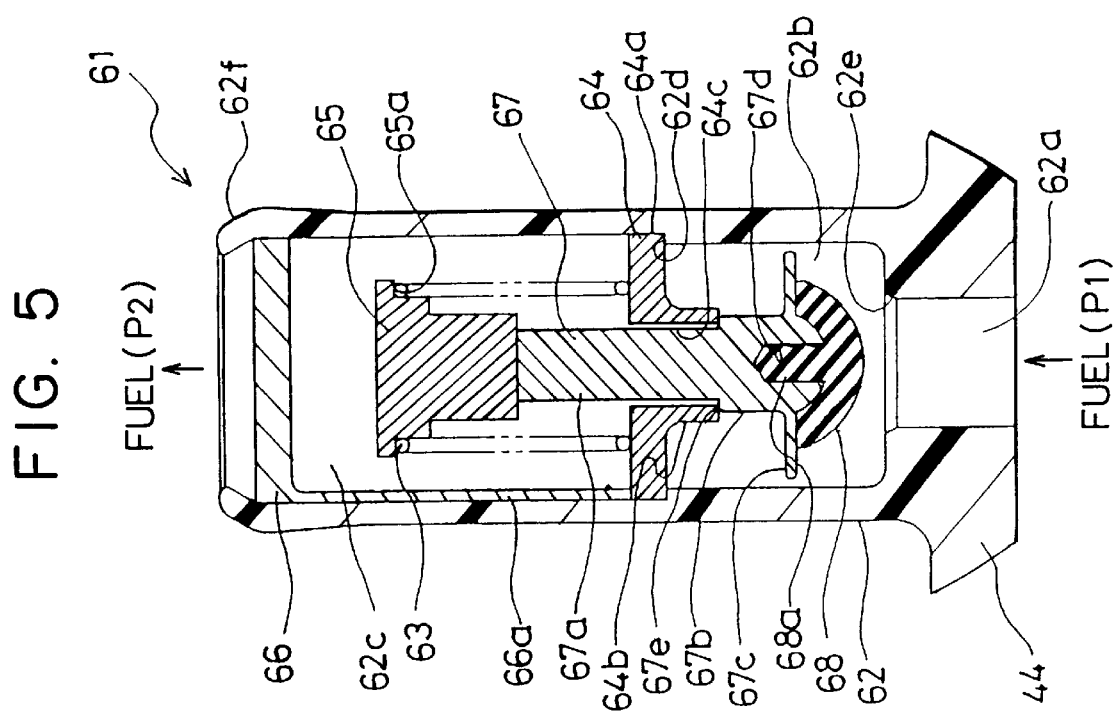
FIG. 5 is an enlarged view of a portion inside the oval shown with the one-dot line V in FIG. 4.

Giving margins to the range of predetermined pressure Pc makes adjustment of compressed coil spring 63 as shown in FIG. 5 easier, which effectively reduces the number of assembling operations as well as manufacturing cost.

The characteristic curves in FIG. 7 show actual values of relative fuel pressure with respect to rotation speed NE of the engine and a negative pressure PM of the intake air suction. With rotation speed NE of the engine decreasing, the negative pressure PM of the intake air suction rapidly decreases and relative fuel pressure temporally increases to 330 kPa during rapid deceleration (R/D), however, it is understood that the pressure returns to 250 kPa immediately after rapid deceleration without being maintained at a high pressure and sustains the system fuel pressure in the state of fuel cut-off (F/C) or idling.

Figure 8:
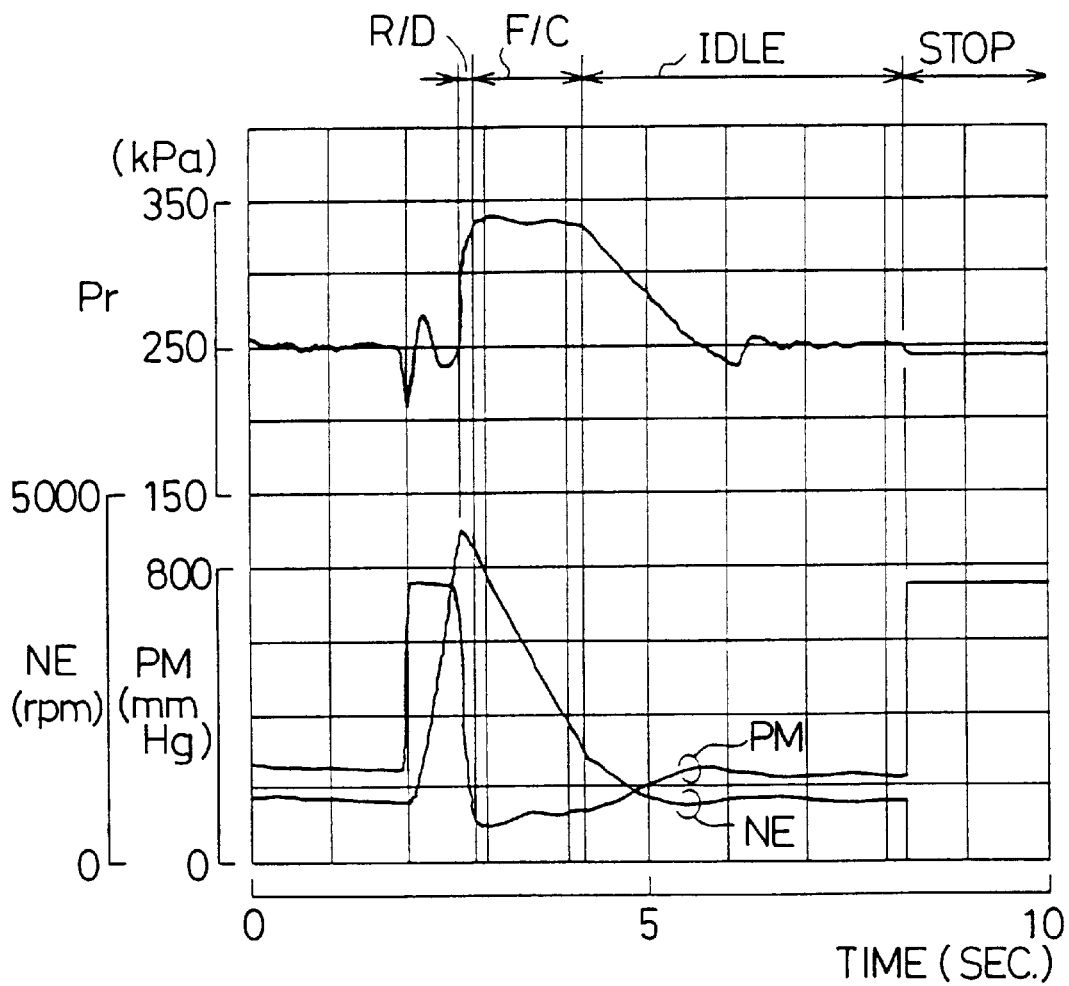
FIG. 8 is a characteristic graph showing an actually-measured value of relative fuel pressure with respect to an operation state of an engine of which fuel is supplied by a fuel supply system of a comparative embodiment.

The characteristic curves as an comparative example in FIG. 8 correspond to FIG. 7 as the characteristic curves of fuel control valve 61 (or 11).

As for construction of the fuel control valve in the comparative example, compressed coil spring 63 is removed from fuel control valve 61. Since the fuel control valve of this comparative example does not have a compressed coil spring imposing a force on the shaft of the fuel control valve in the valve opening direction, the relational formula corresponding to the aforementioned formula (1) showing the load applied in the axial direction of shaft 67 of fuel control valve 61 is expressed by the following formula (5) (unit: N). In this case, "c" represents a friction force generated when the shaft slides inside the sliding hole of the sleeve.

$$A \cdot \Delta P > c \tag{5}$$

This formula expresses the fuel control valve closing when a load exceeding the friction force "c" is imposed on the axial direction of the shaft 67. Thereby, the valve closes by the relative fuel pressure change at the time of rapid deceleration since the valve opens or closes at the threshold of the friction force "c". Then, the pressure in the fuel pipes located at a more fuel downstream side than the fuel control valve and the fuel rail or the like can be maintained at a high pressure even in the sate of fuel cut-off after rapid deceleration or idling. More specifically, after the pressure of 330 kPa is maintained for approximately one second in the state of fuel cut-off, it takes approximately two seconds for the relative fuel pressure to gradually return to 250 kPa, which causes improper fuel injection and degradation of fuel efficiency. Decrease of the pressure inside the fuel rail by fuel injection in the state of idling results in keeping the pressure inside the fuel pipes and the fuel rail or the like at a high pressure until the fuel control valve closes. However, by employing the construction of fuel control valve 61 (or 11) of the present embodiment, the biasing force "f" of compressed coil spring 63 imposes a force on shaft 67 where valve member 68 is fixed in the valve opening direction. By setting biasing force "f" to close the fuel control valve 61 in the range shown in formula (2), the fuel control valve does not close even if relative fuel pressure changes at the time of rapid deceleration but nevertheless can be closed by the fuel pressure change at the time of engine stoppage. According to the present embodiment, improper fuel injection and degradation of fuel efficiency which would otherwise happen at the time of rapid deceleration of a vehicle can be prevented and more appropriate fuel injection can be had effectively with a simple structure.

Although the present embodiment uses a fuel injection system having a constant relative fuel pressure which is obtained by deducting pressure inside the fuel rail and the intake air suction, the present invention can be applied to a fuel injection system having an absolute constant fuel pressure value in the fuel rail without being restricted to the aforementioned application.

Furthermore, signals from pressure sensor 8 for detecting pressure inside fuel rail 6 control fuel pump 2, however, it can be controlled by signals from, for example, an $O_2$ sensor or the like.

(SECOND EMBODIMENT)

A fuel control valve according to a second embodiment of the present invention is hereinafter described with reference to FIGS. 9 and 10A–10C.

A fuel control valve 70 of the second embodiment has a discharging port of a fuel pump in the same manner as in the modified embodiment (FIGS. 4 and 5) of the first embodiment.

A housing 71 of fuel control valve 70 is integrally molded with the housing of a fuel pump with resin and a fuel passage is formed passing through the axial direction of housing 71. The housing 71 is composed of a smaller diameter portion 71a and a larger diameter portion 71b whose inner diameter is larger than that of the smaller diameter portion 71a in the range from the fuel upstream side to the fuel downstream side. The diameter of the opening of the larger diameter portion 71b becomes smaller toward the fuel downstream side.

An annular member 72 as a supporting member is cylindrically formed and contained in the inner periphery of the larger diameter portion 71b. The annular member 72 is engaged with the edge of the fuel upstream side by a step 71c formed at the boundary between the larger diameter portion 71b and the smaller diameter portion 71a, and a flange 72a formed at the edge of the fuel downstream side is engaged with the opening of larger diameter portion 71b, which restricts the motion of the annular member 72 in the axial direction. Plural conically shaped through holes 72b whose diameters become smaller toward the inside in the diameter direction are formed on the side wall of annular member 72 in the peripheral direction.

A ball 73 fits into the through hole 72b and protrudes not toward the inner peripheral wall of the annular member 72 but toward the inside in the diameter direction.

A pressing member 74 is press-fit into the outer periphery of the annular member 72. A spring 75 is fit into the outer periphery of the annular member 72, of which one end is engaged with the flange 72a whereas the other end is engaged with the edge of the fuel downstream side of the pressing member 74. The pressing member 74 and the spring 75 serve as a biasing member. A tapered surface 74a tilting to the fuel downstream side as it goes toward the inner side in the diameter direction is disposed at the edge of the fuel upstream side. The tapered surface 74a contacts the ball 73. The biasing force of spring 75 imposes a force on pressing member 74 to the fuel upstream side and ball 73 is pressed to the inner side in the diameter direction by the tapered surface 74a of the pressing member 74.

An engaging member 76 is supported by the inner wall of the smaller diameter portion 71a enabling it to reciprocate therein. A sliding hole 76a passes through in the axial direction of the engaging member 76 and contains a shaft 81 reciprocable therein. A concave portion 76b is formed at the edge of the fuel downstream side of engaging member 76 and a flange 76c is formed at the outer periphery of the concave portion 76b. The outer peripheral surface of flange 76c is located outside in the diameter direction compared with the position of the most inner peripheral side of ball 73 protruding to the inner periphery and engaged with through hole 72b. The motion of engaging member 76 to the fuel upstream side or the fuel downstream side is restricted by the flange 76c engaged with steps 71c and 72c. A cylindrical portion 76d is formed at the fuel upstream side of engaging member 76.

A valve member 80 is composed of shaft 81, contacting portion 82 and ring 83 as an engaged portion. The shaft 81 is supported by the engaging member 76 reciprocably. The step 81a formed at the shaft 81 is contactable to the edge of the fuel upstream side of the cylindrical portion 76d. The contacting portion 82 is fit into the edge of the fuel upstream side of shaft 81 and can be seated on valve seat 71d formed at the fuel upstream side of smaller diameter portion 71a. The metal ring 83 in the shape of a letter C fits into an annular groove 81b disposed at the fuel downstream side of shaft 81.

One end of a spring 77 as a biasing member is engaged with the step 76b whereas the other end is engaged with the end of the upstream side of shaft 81. When the biasing force of spring 77 is $Fs_1$ and the biasing force of spring 75 is $Fs_2$, $Fs_1$ is smaller than $Fs_2$ ($Fs_1 < Fs_2$).

The operation of fuel control valve 70 is hereinafter explained based on FIGS. 10A–10C and 11.

Figure 11:
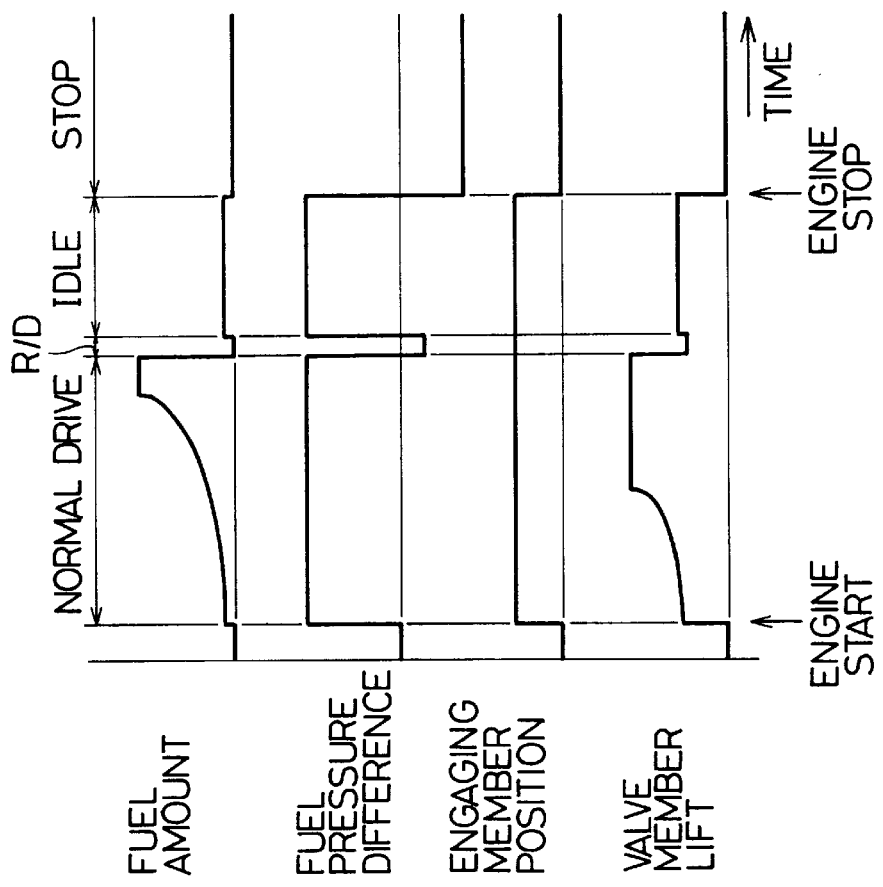
FIG. 11 is a time chart showing the operations of the second embodiment.
Figure 9:
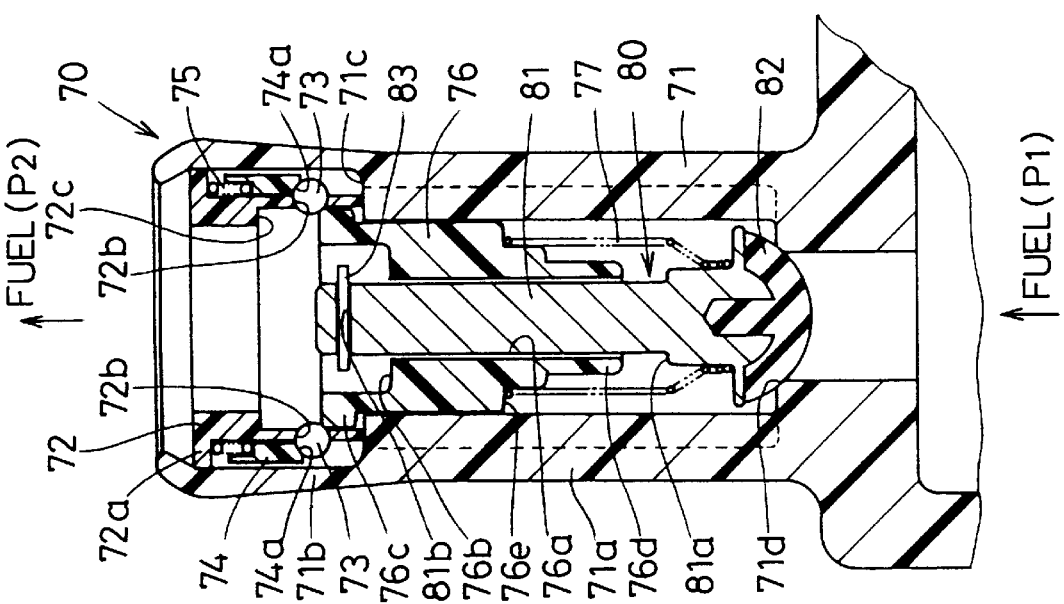
FIG. 9 is a longitudinal cross-sectional view of a fuel control valve of a fuel supply system according to a second embodiment of the present invention.
Figure 10A:
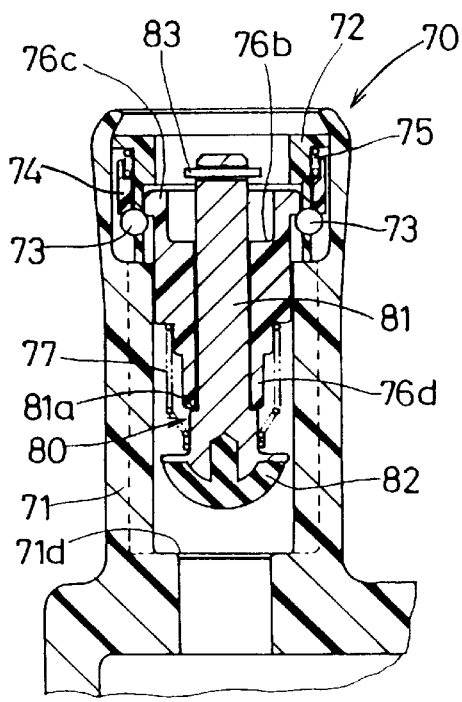
FIGS. 10A–10C are longitudinal cross-sectional views showing operations of the second embodiment where

(A) When the fuel pressure of the fuel upstream side of fuel control valve 70 is $P_1$, fuel pressure at the fuel downstream side is $P_2$ and the differential pressure is $\Delta P_2 = P_1 - P_2$, flange 76c of engaging member 76 is located at a more fuel downstream side than ball 73 at the time of normal vehicle driving due to the differential pressure $\Delta P_2 > 0$ as shown in FIG. 10A and contacting portion 82 of valve member 80 is released from valve seat 71d. Engagement of step 81a of shaft 81 with cylindrical portion 76d restricts motion of valve member 80 to the fuel downstream side. The differential pressure $\Delta P_2$ during normal driving is kept substantially constant as shown in FIG. 11.

Figure 10B:
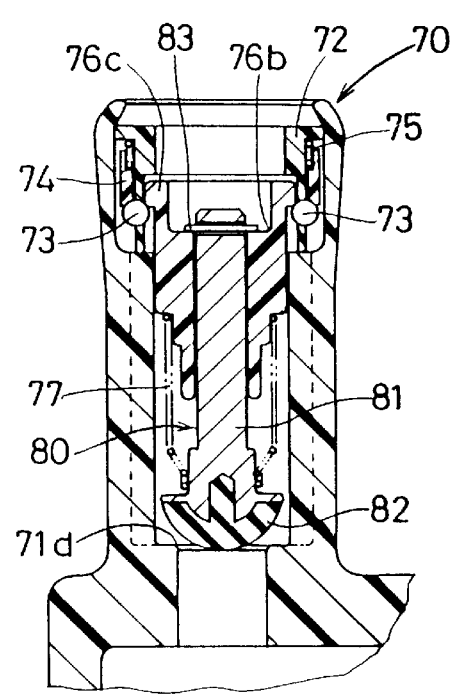

(B) As explained in the modification of the first embodiment, abrupt decrease of the engine load at rapid deceleration (R/D) of a vehicle causes time delay in the decrease of fuel pump discharge pressure thus, as shown in FIG. 10B, fuel pressure $P_2$ at the fuel downstream side becomes larger than fuel pressure $P_1$ at the fuel upstream side. When the maximum differential pressure between $P_2$ and $P_1$ is $\Delta P_3 = P_2 - P_1 > 0$, the force of flange 76c pushing ball 73 to the outside in the diameter direction by a force of engaging member 76 received from the differential pressure $\Delta P_3$ is Fout, and the force of pressuring member 74 pushing ball 73 to the inside in the diameter direction by the biasing force of spring 75 is Fin, the biasing force of spring 75 is set to be Fout<Fin. Accordingly, flange 76c is located at a more fuel downstream side than the ball 73 even at rapid deceleration of a vehicle. At that time, differential pressure $\Delta P_3$ is equivalent to the maximum changing value Pmax of the intake air suction pressure described in the modification of the first embodiment.

The valve member 80 moves to the fuel upstream side by the force toward the fuel upstream side due to differential pressure $\Delta P_3$ and a biasing force of spring 77. However, since ring 83 is engaged with the concave portion 76b of engaging member 76, contacting portion 81 is not seated on valve seat 71d. Because fuel control valve 70 does not close even at fuel cut-off during rapid vehicle deceleration pressure at the fuel downstream side is prevented from being held at a high pressure and fuel injection can be performed continuously corresponding to the state of engine operations.

Figure 10C:
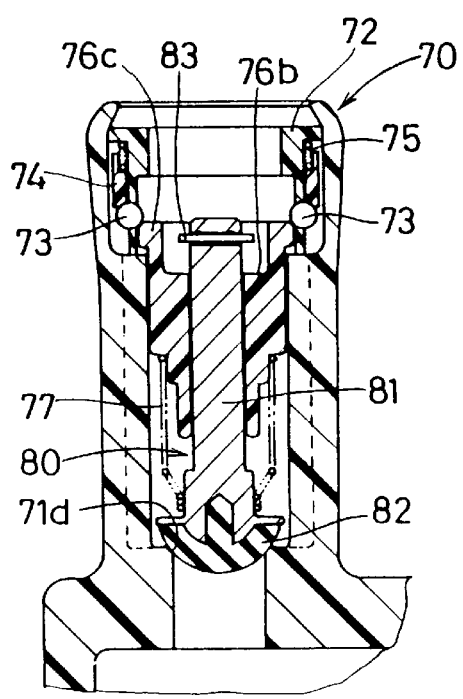
Figure 12:
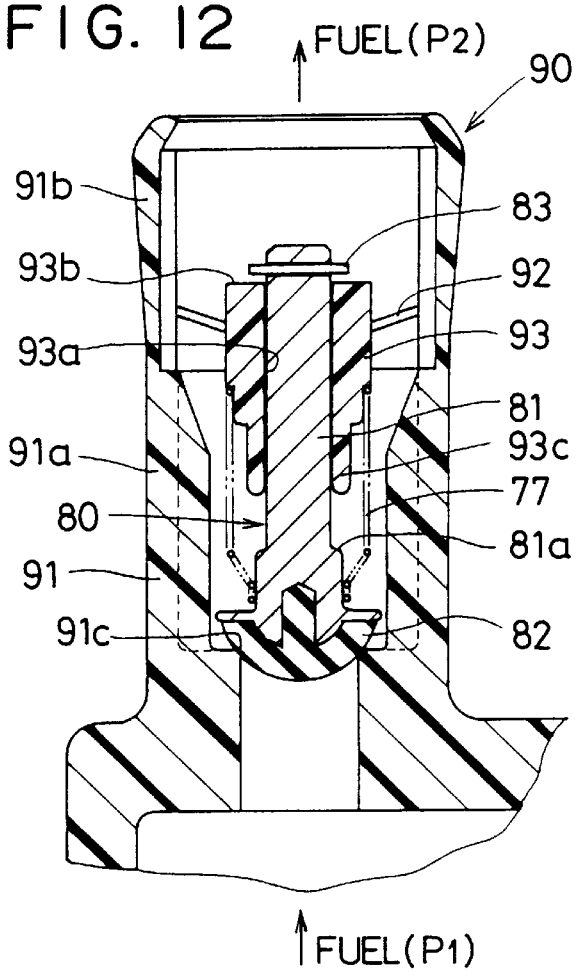
FIG. 12 is a longitudinal cross-sectional view of a fuel control valve of a fuel supply system according to a third embodiment of the present invention.

(C) When the engine stops and the fuel injection valves are closed, the differential pressure between the fuel downstream side and the fuel upstream side becomes larger than that during rapid deceleration. When the differential pressure is $\Delta P_4 = P_2 - P_1$ at that time, Fout is larger than Fin (Fout>Fin), ball 73 is pushed out in the diameter direction and flange 76c moves to a more fuel upstream side than the ball 73. Then, contacting portion 82 is seated on valve seat 71a to close fuel control valve 70 as shown in FIG. 10C. Thereby, the pressure at the downstream side of fuel control valve 70 can be maintained at a high pressure during engine stoppage, so that vapor generation in the fuel can be suppressed. In this case the differential pressure $\Delta P_4$ is equivalent to the system fuel pressure Psys as explained for the modified embodiment of the first embodiment.

Since contacting portion 82 is pressed to valve seat 71d by the biasing force of spring 77 even if fuel pressure at the downstream side of the fuel control valve 70 decreases due to fuel leakage from fuel injection valves or damage of fuel pipes at the fuel downstream side of fuel control valve 70, contacting portion 82 is not released from valve seat 71d and fuel control valve 70 does not open unless the differential pressure $\Delta P_2 = P_1 - P_2$ becomes larger than a predetermined pressure $Pc_2$. Thus, fuel leakage from fuel control valve 70 to the fuel downstream side can be prevented at the time of engine stoppage.

When the engine starts to increase fuel pressure $P_1$ at the fuel upstream side of the fuel control valve and $\Delta P_2$ becomes larger than $Pc_2$ ($\Delta P_2 > Pc_2$), the contacting portion 82 is released from valve seat 71d, so that flange 76c pushes out ball 73 outside in the diameter direction to be located at a more fuel downstream side than ball 73.

(THIRD EMBODIMENT)

A fuel control valve according to a third embodiment of the present invention is hereinafter described with reference to FIGS. 12 and 13A–13C.

A housing 91 of fuel control valve 90 is integrally molded with the housing of the fuel pump with resin and a fuel passage is formed passing in the axial direction of housing 91. The housing 91 is composed of smaller diameter portion 91a and larger diameter portion 91b whose inner diameter is larger than smaller diameter portion 91a from the fuel upstream side to the fuel downstream side. The diameter of the opening of the larger diameter portion 91b becomes smaller toward the fuel downstream side.

The outer periphery of a flat spring 92 is fixed to the inner peripheral wall of larger diameter portion 91b whereas the inner periphery of flat spring 92 is fixed to an engaging member 93. The engaging member 93 is supported by flat spring 92 reciprocably. A sliding hole 93a passes in the axial direction of the engaging member 93 and contains a shaft 81 reciprocably therein. A cylindrical portion 93c is formed at the end of the fuel upstream side of the engaging member 93.

The shaft 81 of valve member 80 is shorter than the shaft of the second embodiment. The contacting portion 82 is contactable with a valve seat 91c formed at the fuel upstream side of smaller diameter portion 91b.

The operation of fuel control valve 90 is hereinafter explained.

Figure 13A:
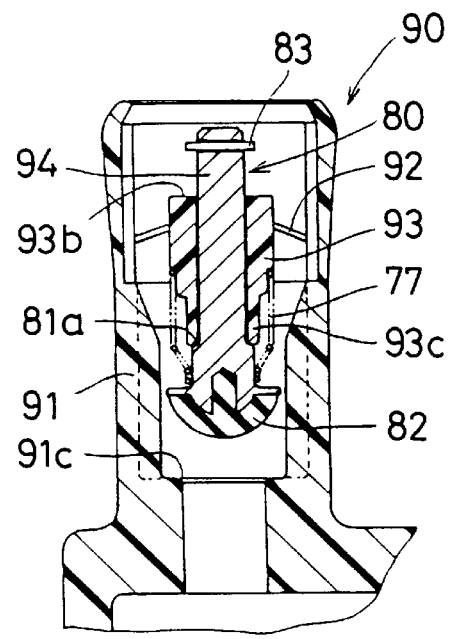
FIGS. 13A–13C are longitudinal cross-sectional views showing operations of the third embodiment where
Figure 13C:
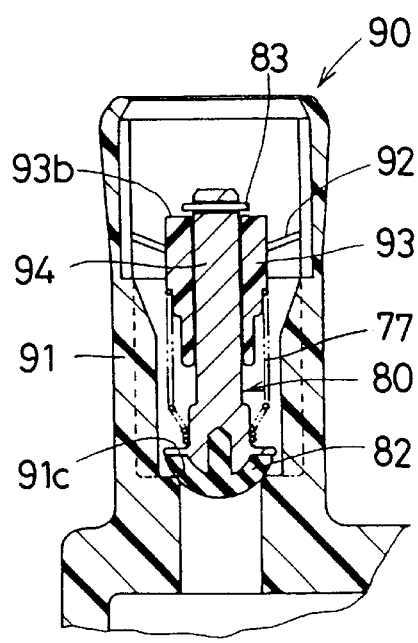
Figure 13B:
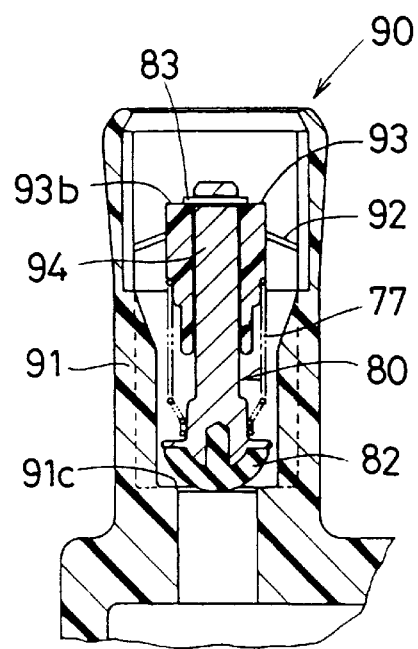

(A) When a fuel pressure of the fuel upstream side of fuel control valve 90 is $P_1$, a fuel pressure at the fuel downstream side is $P_2$, and the differential pressure is $\Delta P_2 = P_1 - P_2$ contacting portion 82 is released from valve seat 91c due to the differential pressure $\Delta P_2 > 0$ at the time of normal vehicle driving as shown in FIG. 13A and the ring 83 is located at a more fuel downstream side than the end of the downstream side 92a of engaging member 92. Engagement of step 81a with the cylindrical portion 93c restricts the lifting amount of valve member 80.

(B) Abrupt decrease of the engine load at rapid vehicle deceleration causes a time delay in the corresponding decrease of the fuel pump discharge pressure thus, fuel pressure $P_2$ at the fuel downstream side becomes larger than fuel pressure $P_1$ at the fuel upstream side at the time of fuel cut-off. When the maximum differential pressure between $P_2$ and $P_1$ is $\Delta P_3 = P_2 - P_1 > 0$, the force of the engaging member 93 received from differential pressure $\Delta P_3$ is smaller than the biasing force of flat spring 92 to maintain the engaging member 93 at the position shown in FIG. 13A. On the other hand, valve member 80 moves to the fuel upstream side due to the force received from the differential pressure $\Delta P_3$ toward the fuel upstream side and the biasing force of spring 77. However, since ring 83 is engaged with end 93b of the fuel downstream side of engaging member 93, contacting portion 82 is not seated on valve seat 91c. Because fuel control valve 90 does not close even at fuel cut-off at rapid vehicle deceleration, the fuel pressure downstream side is prevented from being held at a high pressure and the fuel control valve performs fuel injection continuously corresponding to the state of engine operations.

(C) When the engine stops and the fuel injection valves are closed, the differential pressure in the fuel pressure between the fuel downstream side and the fuel upstream side becomes larger than that of the period of rapid deceleration. When the differential pressure at that time is $\Delta P_4 = P_2 - P_1 > 0$, engaging member 93 counters the force of flat spring 92 maintaining engaging member 93 shown in the states of FIGS. 13A and 13B to move to the fuel upstream side due to the force received by the differential pressure $\Delta P_4$. Then, contacting portion 82 is seated on valve seat 91c to close fuel control valve 90. Thereby, pressure at the downstream side of fuel control valve 90 can be maintained at a high pressure during engine stoppage which can suppress vapor generation in the fuel.

Since contacting portion 82 is pressed to valve seat 91c by the biasing force of spring 77 even if fuel pressure at the downstream side of fuel control valve 90 decreases at engine stoppage, fuel control valve 90 does not open unless the differential pressure $\Delta P_2 = P_1 - P_2$ becomes larger than a predetermined pressure $Pc_2$. Thus, fuel leakage from fuel control valve 90 to the fuel downstream side can be prevented at engine stoppage.

When the engine starts to increase fuel pressure at the fuel upstream side of fuel control valve 90 and $\Delta P_2$ becomes larger than $Pc_2$ ($\Delta P_2 > Pc_2$), contacting portion 82 is released from valve seat 91c, so that engaging member 93 counters the biasing force of flat spring 92 toward the fuel upstream side and moves to the position as shown in FIG. 13A to open fuel control valve 90.

According to the second and the third embodiments of the present invention, the ring 83 as an engaged portion is integrally formed with the shaft 81; however, the engaged portion and the shaft can be integrally formed. Although the engaging member has functions to engage the ring as well as to support the shaft reciprocably and they are integrally formed, they can be formed with different members for the respective functions.

In the second and the third embodiments, even if the differential pressure between the fuel pressure $P_2$ at the fuel downstream side and the fuel pressure $P_1$ at the fuel upstream side becomes the maximum differential pressure $\Delta P_3$ during driving of the engine, the engaging member does not move to the position at the fuel upstream side where the contacting portion can contact the valve seat; however, the engaging member should move to the fuel upstream side at the time of the engine stoppage. Furthermore, only when the engine is turned off, $\Delta P_1 = P_2 - P_1$ becomes larger than $\Delta P_3$. Therefore, when the engaging member moves to the position at the fuel upstream side where the contacting portion can contact the valve seat, $\Delta P_1$ should be larger than the predetermined pressure $Pc_1$ satisfying $\Delta P_3 < Pc_1 \Delta P_4$ (at engine stoppage).

Furthermore, the pressure sensor detects the pressure inside the fuel rail in the embodiments and a fuel pump discharge amount is fed back based on the detected value. The present invention is not limited to use of such a pressure sensor. A constant current circuit for controlling fuel pump driving current even if fuel supplied inside the supply pipes changes can be used instead of the pressure sensor. In such a case, the present invention can be applied to a system having a fuel pump feedback control unit for the discharge amount.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A returnless type fuel supply system, comprising:
   a fuel pump;
   a fuel injection valve;
   a pipe for supplying fuel from the fuel pump to the fuel injection valve for injection to an internal combustion engine;
   a control unit for controlling the fuel pump by feedback control; and
   a fuel control valve for shutting off communication between a fuel upstream side and a fuel downstream side of the pipe when a differential pressure $\Delta P = P_2 - P_1$ between fuel pressure $P_2$ at the fuel downstream side and fuel pressure $P_1$ at the fuel upstream side is larger than a predetermined positive threshold differential pressure, and for turning on communication between the fuel upstream side and the fuel downstream side when the differential pressure $\Delta P$ is lower than the predetermined positive threshold differential pressure, the predetermined positive threshold differential pressure being set to have a predetermined relationship to the peak value of intake air pressure and to a differential pressure between fuel supply pressure and the intake air pressure.

2. A returnless type fuel supply system according to claim 1, wherein:
   the predetermined Pc pressure is expressed as Pmax<Pc<Psys, with Pmax, Pc and Psys being a maximum changing value of a pressure inside an air suction pipe of the engine, the predetermined pressure and a differential pressure between a fuel supplying pressure to the fuel injection valve and the pressure inside the air suction pipe, respectively.

3. A returnless type fuel supply system according to claim 2, wherein the predetermined pressure Pc is between 90 kPa and 250 kPa.

4. A returnless type fuel supply system according to claim 1, wherein the fuel control valve includes:
   a valve body having a valve seat located in a fuel passage formed therein, and a fixed portion located at a fuel downstream side with respect to the valve seat;
   a movable portion having a shaft reciprocably supported by the fixed portion inside the fuel passage, a valve member located at one end of the shaft between the valve seat and the fixed portion and contactable with the valve seat, and a movable portion having a stopper located at a fuel downstream side with respect to the fixed portion and located at the other end of the shaft; and
   biasing means located between the fixed portion and the stopper for imposing a force on the movable portion toward the fuel downstream side.

5. A returnless type fuel supply system according to claim 4, wherein:
   the valve body is integrally formed with a housing of the fuel pump.

6. A returnless type fuel supply system comprising:
   a fuel pump;
   a fuel injection valve;
   a pipe for supplying fuel from the fuel pump to the fuel injection valve for injection into an air suction pipe of an internal combustion engine;
   a fuel control valve for shutting off communication between a fuel upstream side and a fuel downstream side of the pipe when a differential pressure $\Delta P_1 = P_2 - P_1$ between fuel pressure $P_2$ at the fuel downstream side and fuel pressure $P_1$ at the fuel upstream side is larger than a predetermined positive threshold differential pressure $Pc_1$, and for turning on communication between the fuel upstream side and the fuel downstream side when a differential pressure $\Delta P_2 = P_2 - P_1$ is larger than a predetermined positive threshold differential pressure $Pc_2$;
   wherein the predetermined positive threshold differential pressures $Pc_1$ and $Pc_2$ fall within the range of $\Delta P_3 < (Pc_1, Pc_2) < \Delta P_4$ with the maximum differential pressure between the fuel pressure $P_2$ and the fuel downstream side and the fuel pressure $P_1$ at the fuel upstream side of the fuel control valve being $\Delta P_3 = P_2 - P_1$ during driving of the internal combustion engine and with a differential pressure between the fuel pressure $P_2$ at the fuel downstream side and the fuel pressure $P_1$ at the fuel upstream side of the fuel control valve being $\Delta P_4 = P_2 - P_1$ at the time of engine stoppage.

7. A returnless type fuel supply system according to claim 6, wherein the fuel control valve includes:
- a valve seat located in a fuel passage inside the fuel control valve;
- a valve member having a contacting portion capable of closing the fuel passage by moving toward the fuel upstream side of the valve to seat on the valve seat, and an engagement portion;
- biasing means for imposing a force on the valve member to bias it toward the valve seat; and
- an engaging member reciprocable in the fuel passage due to the differential pressure between the fuel upstream side and the fuel downstream side of the fuel control valve and engageable with the engagement portion;
- wherein the contacting portion is not seated on the valve seat when the engaging member is engaged with the engaged portion, and is seated on the valve seat by moving the engaging member from a position to be engaged with the engaged portion to the fuel upstream side after $\Delta P_1$ becomes larger than $Pc_1$ ($\Delta P_1 > Pc_1$); and
- wherein the contacting portion is released from the valve seat after being seated in the valve seat when $\Delta P_2$ becomes larger than $Pc_2$ ($\Delta P_2 > Pc_2$).

8. A returnless type fuel supply system according to claim 7, wherein the fuel control valve includes:
- a ball;
- a supporting member having a through hole into which the ball fits and protrudes in a radially inward direction of the valve, and disposed at an outer periphery of the engaging member; and
- another biasing means for imposing a force on the ball toward the radially inward direction;
- wherein the engaging member is able to push out the ball in the radially outward direction by countering a biasing force of the another biasing means and to reciprocate responsive to a force of the engaging member produced by the differential pressure between the fuel upstream side and the fuel downstream side of the fuel control valve.

9. A returnless type fuel supply system according to claim 7, wherein the fuel control valve includes:
- a flat spring provided at an outer periphery of the engaging member;
- wherein the engaging member is reciprocable, countering a biasing force of the flat spring, responsive to a force of the engaging member produced by the differential pressure between the fuel upstream side and the fuel downstream side of the fuel control valve.

10. A returnless type fuel supply system comprising:
- a fuel pump;
- a fuel injection valve;
- a pipe for supplying fuel from the fuel pump to the fuel injection valve for injection into the internal combustion engine;
- a control unit for controlling the fuel pump by feedback control;
- a fuel control valve for shutting off communication between a fuel upstream side and a fuel downstream side of the pipe when a differential pressure between fuel pressure at the fuel downstream side and fuel pressure at the fuel upstream side is larger than a predetermined positive threshold differential pressure, and for turning on communication between the fuel upstream side and the fuel downstream side when the differential pressure is lower than the predetermined positive threshold differential pressure; and
- a floe volume control valve located between the fuel pump and the pipe, the flow volume control valve having a main passage which communicates the fuel pump to the pipe, a return passage which permits communication between the main passage and a location outside of the main passage and a movable member located in the main passage for controlling communication between the main passage and the return passage to the outside location depending on engine conditions.

11. A returnless type fuel supply system according to claim 10, wherein:
- the flow control valve and the fuel pump are located in a fuel tank.

12. A returnless type fuel supply system according to claim 10, wherein:
- the flow volume control valve has an energization coil which electrically controls movement of the movable member so that the movable member closes the return passage during an engine stoppage and during an engine full load condition and opens the return passage during other engine conditions.

13. A returnless fuel supply system for a fuel-injected engine comprising:
- a feedback-controlled fuel pump supplying fuel from a fuel tank to an injector fuel rail via a single fuel control valve;
- said fuel control valve including means for closing the valve when differential fuel pressure thereacross is less than a first value and for opening the valve when differential fuel pressure thereacross is greater than a second value different from said first value, said first and second values each having predetermined relationships to instantaneous fuel supply pressure and to engine intake manifold air pressure.

14. A method for controlling fuel flow in a returnless fuel supply system for a fuel-injected engine, said method comprising:
- supplying fuel from a fuel tank to an injector fuel rail via a single fuel control valve using a feedback-controlled fuel pump;
- closing the valve when differential fuel pressure thereacross is less than a first value; and
- opening the valve when differential fuel pressure thereacross is greater than a second value different from said first value;
- said first and second values each having predetermined relationships to instantaneous fuel supply pressure and to engine intake manifold air pressure.

15. A returnless fuel supply system for a fuel-injected engine comprising:
- a feedback-controlled fuel pump supplying fuel from a fuel tank to an injector fuel rail via a single fuel control valve;

said fuel control valve including means for opening the valve when differential fuel pressure $\Delta P = P_2 - P_1$ between downstream fuel pressure $P_1$ and upstream fuel pressure $P_2$ thereacross is at or below a predetermined positive threshold differential pressure thereby permitting some reverse-directed fuel flow through said control valve to accommodate engine idle conditions.

16. A method for controlling fuel flow in a returnless fuel supply system for a fuel-injected engine, said method comprising:

supplying fuel from a fuel tank to an injector fuel rail via a single fuel control valve using feedback-controlled fuel pump; and opening the valve when differential fuel pressure $\Delta P = P_2 - P_1$ between downstream fuel pressure $P_1$ and upstream fuel pressure $P_2$ thereacross is at or below a predetermined positive threshold differential pressure thereby permitting some reverse-directed flow through said control valve to accommodate engine idle conditions.

* * * * *